(12) United States Patent
Yang et al.

(10) Patent No.: US 8,192,595 B2
(45) Date of Patent: Jun. 5, 2012

(54) TRANSITION METAL/CARBON NANOTUBE COMPOSITE AND METHOD OF PREPARING THE SAME

(75) Inventors: Ho-jung Yang, Suwon-si (KR); Hyo-rang Kang, Anyang-si (KR); Kwang-bum Kim, Seoul (KR); Jin-go Kim, Seoul (KR)

(73) Assignees: Samsung Electronics Co., Ltd. (KR); Industry-Academic Cooperation Foundation, Yonsei University (KR)

( * ) Notice: Subject to any disclaimer, the term of this patent is extended or adjusted under 35 U.S.C. 154(b) by 264 days.

(21) Appl. No.: 12/629,209

(22) Filed: Dec. 2, 2009

(65) Prior Publication Data

US 2010/0181200 A1     Jul. 22, 2010

(30) Foreign Application Priority Data

Jan. 22, 2009  (KR) .................. 10-2009-0005567

(51) Int. Cl.
*C25B 11/06* (2006.01)
*C25B 11/12* (2006.01)

(52) U.S. Cl. .............. 204/290.15; 204/290.01; 204/294; 204/554; 204/660; 204/674; 204/672; 252/506; 252/513; 252/521.2; 423/445 B; 423/594.3; 423/594.5; 423/594.19; 502/101; 502/182; 502/258; 502/259; 502/260; 427/453; 427/576; 427/584; 427/126.6; 427/255.19; 427/372.2; 977/742; 361/502

(58) Field of Classification Search .................. 204/294, 204/290.01, 290.15, 554, 660, 672, 674; 252/506, 513, 521.2; 423/445 B, 594.3, 423/594.5, 594.19; 502/101, 182, 258, 259, 502/260; 427/453, 576, 584, 126.6, 255.19, 427/372.2; 977/742
See application file for complete search history.

(56) References Cited

U.S. PATENT DOCUMENTS

2006/0263289 A1* 11/2006 Heo et al. .................. 423/447.3

FOREIGN PATENT DOCUMENTS

| JP | 2005-009083 A | 1/2005 |
| JP | 2005-243989 A | 9/2005 |
| KR | 1020030014224 A | 2/2003 |
| KR | 1020050096688 A | 10/2005 |
| KR | 1020050116107 A | 12/2005 |

OTHER PUBLICATIONS

Fan, et al., Preparation and capacitive properties of cobalt-nickel oxides/carbon nanotube composites, ScienceDirect, Electrochimica Acta 52 (2007) 2959-2965.
Kuan-Xin, et al., Electrodeposition of Nickel and Cobalt Mixed Oxide/Carbon Nanotube Thin Films and Their Charge Storage Properties, Journal of the Electrochemical Society, 153 (8) A1568-A1574 (2006).

* cited by examiner

*Primary Examiner* — Bruce Bell
(74) *Attorney, Agent, or Firm* — Cantor Colburn LLP (57) ABSTRACT

A transition metal/carbon nanotube composite includes a carbon nanotube and a transition metal oxide coating layer disposed on the carbon nanotube. The transition metal oxide coating layer includes a nickel-cobalt oxide.

17 Claims, 4 Drawing Sheets

TRANSITION METAL/CARBON NANOTUBE COMPOSITE AND METHOD OF PREPARING THE SAME

CROSS-REFERENCE TO RELATED APPLICATION

This application claims priority to Korean Patent Application No. 10-2009-0005567, filed on Jan. 22, 2009, and all the benefits accruing therefrom under 35 U.S.C. §119, the contents of which in its entirety are herein incorporated by reference.

BACKGROUND

1) Field

One or more embodiments of the present invention relate to a transition metal/carbon nanotube composite, a method of preparing the same, an electrode including the transition metal/carbon nanotube composite, a capacitive deionization device including the electrode and an electric double layer capacitor including the electrode.

2) Description of the Related Art

Capacitive deionization ("CDI") is a technique for removing an ionic material in a medium by absorbing the ionic material into nano-sized pores of a surface of a carbon electrode. More specifically, in CDI, a first voltage is applied to the carbon electrode to absorb the ionic material therein, while a second voltage having an opposite polarity to the first voltage is applied to the carbon electrode to regenerate the carbon electrode after the ionic material is absorbed by the carbon electrode and removed from the medium. The absorbed ionic material is then discharged from the carbon electrode with water. As a result, CDI does not require chemicals to regenerate the carbon electrode, nor does CDI require an ion exchange resin and/or expensive filter or membrane. Also, in CDI, hard constituent materials and harmful ions are removed from the carbon electrode, and an insulation function, e.g., a removal function, and a capacitance of the carbon electrode are thereby improved.

In CDI, when a direct current ("DC") voltage having a relatively low potential difference is applied to the carbon electrode while water containing dissolved ions flows through a flow path including the carbon electrode therein, anions of the dissolved ions are absorbed and concentrated at an anode, while cations of the dissolved ions are absorbed and concentrated at a cathode. Accordingly, when application of the DC voltage to the carbon electrode is stopped, the anions and cations, concentrated at the anode and the cathode, respectively, are desorbed from the carbon electrode.

The carbon electrode is typically manufactured by binding an activated carbon having a polytetrafluoroethlyene ("PTFE") binder to ensure that the carbon electrode has sufficiently low electrode resistance and large specific surface area. Alternatively, the carbon electrode may be manufactured by carbonizing a resorcinol formaldehyde resin and then performing a complicated drying process to manufacture a carbon electrode having a plate shape.

However, when a general carbon active material is used to manufacture the carbon electrode, a capacitance of the carbon electrode is substantially limited.

SUMMARY

Exemplary embodiments of the present invention include a nanotube composite and, more specifically, a transition metal/carbon nanotube composite having substantially improved capacitance characteristics providing a substantially improved ionic material removal rate.

Exemplary embodiments of the present invention further include an electrode including the transition metal/carbon nanotube composite.

Exemplary embodiments of the present invention also include a capacitive deionization device including the electrode having the transition metal/carbon nanotube composite.

Exemplary embodiments of the present invention also include an electric double layer capacitor including the electrode having the transition metal/carbon nanotube composite.

Exemplary embodiments of the present invention also include a method of preparing the transition metal/carbon nanotube composite.

Exemplary embodiments of the present invention include a transition metal/carbon nanotube composite including a carbon nanotube and a transition metal oxide coating layer disposed on the carbon nanotube. The transition metal oxide coating layer includes a nickel-cobalt oxide.

A molar ratio of nickel to cobalt in the nickel-cobalt oxide may be about 1:2.

The nickel-cobalt oxide may include $NiCo_2O_4$.

The transition metal oxide coating layer may further include nickel oxide, a cobalt oxide and/or a mixture thereof.

The nickel oxide may include NiO.

The cobalt oxide may include $Co_3O_4$.

Under X-ray diffraction analysis conditions including a phase from about 5 degrees to about 80 degrees, 0.02 degrees/step and X-rays of 40 kV/20 mA, the nickel-cobalt oxide may exhibit peaks right-shifted by about 0.5 degrees to about 1.5 degrees from each of a first $Co_3O_4$ peak at about 57 to about 61 degrees, and a second $Co_3O_4$ peak at about 63 to about 67 degrees.

Under raman spectrum analysis conditions including an Ar-ion laser with a wavelength of 514.532 nm, power of 0.5 W at sample, a time of 90 seconds, and an accumulation of 1 objective×50 (e.g., about 0.84 μm), the nickel-cobalt oxide may exhibit a first peak in a raman shift range with a raman spectrum of $531 \pm 20$ cm$^{-1}$, and a second peak in a raman shift range with a raman spectrum of $680 \pm 20$ cm$^{-1}$. In addition, a ratio of a full width at half maximum of the second peak ("FWHM2") to a full width at half maximum of the first peak ("FWFM1"), e.g., a FWHM2/FWFM1 ratio, may be about 0.1 to about 0.5.

An alternative exemplary embodiment of the present invention includes an electrode for a capacitive deionization device including the transition metal/carbon nanotube composite.

Another alternative exemplary embodiment of the present invention includes a capacitive deionization device including the electrode.

Yet another alternative exemplary embodiment of the present invention includes an electric double layer capacitor including the electrode.

Yet another alternative exemplary embodiment of the present invention includes a method of preparing a transition metal/carbon nanotube composite. More specifically, the method includes coating a transition metal hydroxide on a carbon nanotube and performing high temperature treatment on the carbon nanotube on which the transition metal hydroxide is coated. The transition metal hydroxide includes a nickel-cobalt hydroxide.

A molar ratio of nickel to cobalt in the nickel-cobalt hydroxide may be about 1:2.

The transition metal hydroxide may further include a nickel hydroxide, a cobalt hydroxide and/or mixtures thereof.

The transition metal hydroxide may be coated on the carbon nanotube by hydrolyzing urea in a precursor solution.

The precursor solution may be prepared by mixing a urea/carbon nanotube composite with a transition metal salt solution.

The transition metal salt solution may include nitric nickel, acetic nickel, nickel chloride, nickel carbonate, nickel sulfate and mixtures thereof and/or cobalt sulfate, nitric cobalt, cobalt chlorite and mixtures thereof, and/or mixtures thereof.

The urea/carbon nanotube composite may be prepared by mixing the carbon nanotube and a urea solution.

BRIEF DESCRIPTION OF THE DRAWINGS

The above and/or other aspects, features and advantages of the present invention will become more readily apparent by describing in further detail exemplary embodiments thereof with reference to the accompanying drawings, in which.

DETAILED DESCRIPTION

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

A nanotube composite according to an exemplary embodiment includes a carbon nanotube and a transition metal oxide coating layer disposed on the carbon nanotube. In an exemplary embodiment, the nanotube composite is a transition metal/carbon nanotube composite, and the transition metal oxide coating layer includes a nickel-cobalt oxide.

In an exemplary embodiment, the carbon nanotube used in a transition metal/carbon nanotube composite may be a carbon allotrope in the form of a graphite tube having a nano-sized diameter, and may be, for example, a single-walled nanotube, or, alternatively, a multi-walled nanotube.

The transition metal oxide in a transition metal/carbon nanotube composite according to an exemplary embodiment may be disposed on an entire surface of a carbon nanotube having a large surface area rather than being aggregated on only a portion of the surface of a porous carbon nanotube. The transition metal/carbon nanotube composite may have high electric conductivity and a large specific surface area, and thus may be usefully utilized in a lithium secondary battery, a super-capacity capacitor (e.g., an electronic bilayer capacitor and/or a pseudocapacitor, for example), and/or an electrode of a polymer battery, for example, while alternative exemplary embodiments are not limited thereto.

In the nickel-cobalt oxide coated on a carbon nanotube, a molar ratio of nickel to cobalt may be about 1:2. In addition, the nickel-cobalt oxide may include, for example, $NiCo_2O_4$.

According to an exemplary embodiment, the transition metal oxide coating layer may further include a nickel oxide, a cobalt oxide and/or a mixture thereof. In an exemplary embodiment, the nickel oxide may be NiO, and the cobalt oxide may be $Co_3O_4$, but alternative exemplary embodiments are not limited thereto.

A transition metal/carbon nanotube composite according to an exemplary embodiment includes a carbon nanotube on which a transition metal oxide layer is coated. In an exemplary embodiment, the transition metal oxide layer may include $NiCo_2O_4$, $NiCo_2O_4$ and NiO, and/or $NiCo_2O_4$ and $Co_3O_4$.

Hereinafter, spectrum characteristics of a nickel-cobalt oxide used in an exemplary embodiment of a transition metal/carbon nanotube composite will be described in further detail with reference to FIGS. 1 and 2.

Figure 1:
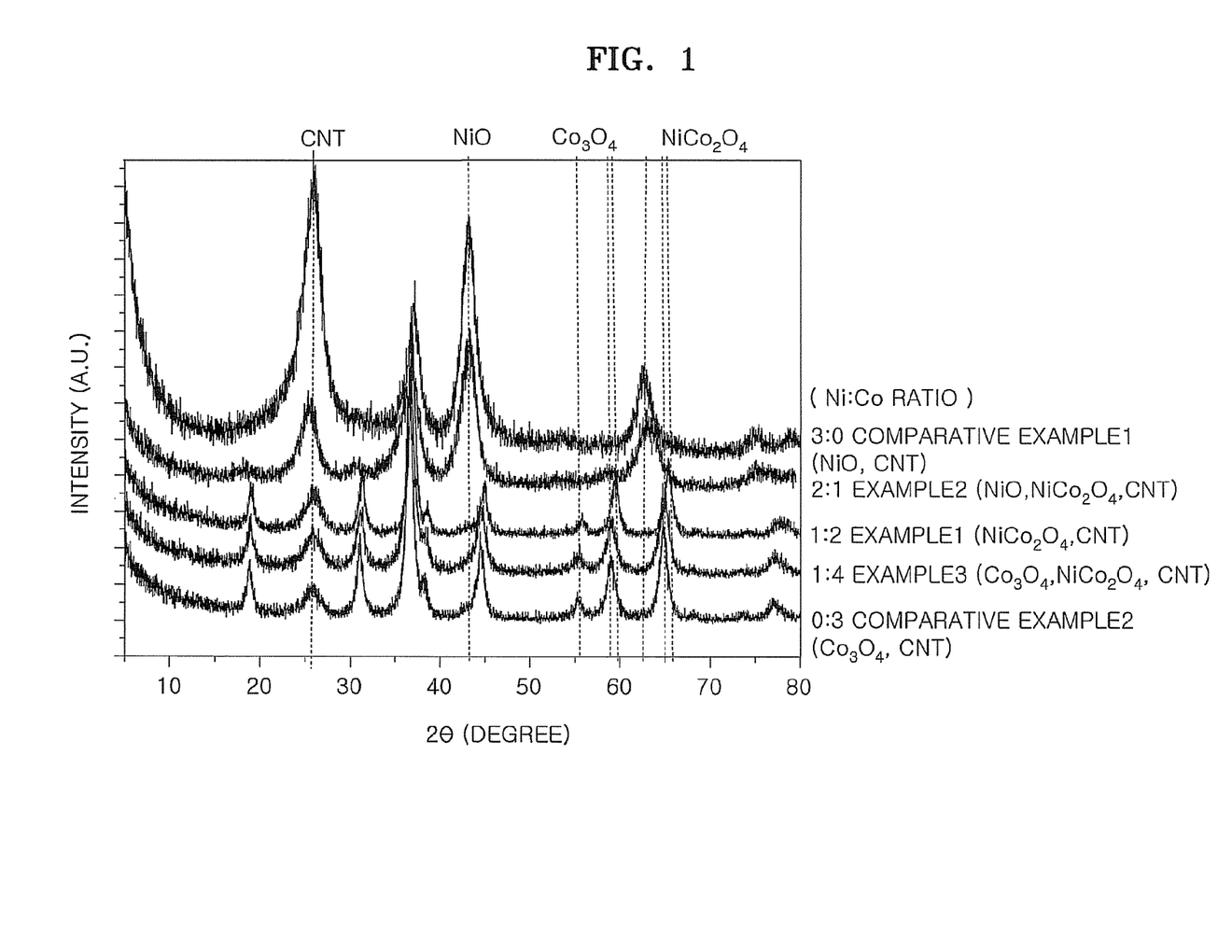
FIG. 1 is a graph of intensity versus angle showing results of X-ray diffraction ("XRD") analysis of transition metal/carbon nanotube composite Examples 1 to 3 and Comparative Examples 1 and 2.

FIG. 1 is a graph of intensity versus angle showing X-ray diffraction ("XRD") analysis results of transition metal/carbon nanotube composite Examples 1 to 3 and Comparative Examples 1 and 2.

Referring to FIG. 1, the transition metal/carbon nanotube composite prepared for Example 1, 2 and 3 exhibits peaks having high-shifts, e.g., right-shifts, by about 1 degree from each of a first $Co_3O_4$ peak and a second $Co_3O_4$ peak (at about 60 degrees and about 65 degrees, respectively) on a plot of XRD analysis under conditions including: a phase from about 5 degrees to about 80 degrees; 0.02 degrees/step; and X-rays at 40 kV/20 mA. Thus, it may be seen that the peaks for Examples 1, 2 and 3 are due to the transition metal oxide coated on the carbon nanotube, e.g., a nickel-cobalt oxide including $NiCo_2O_4$. In addition, it can be seen from FIG. 1 that the first $Co_3O_4$ peak is in a range of about 57 degrees to about 61 degrees, while the second $Co_3O_4$ peak is in a range of about 63 degrees to about 67 degrees.

Figure 2:
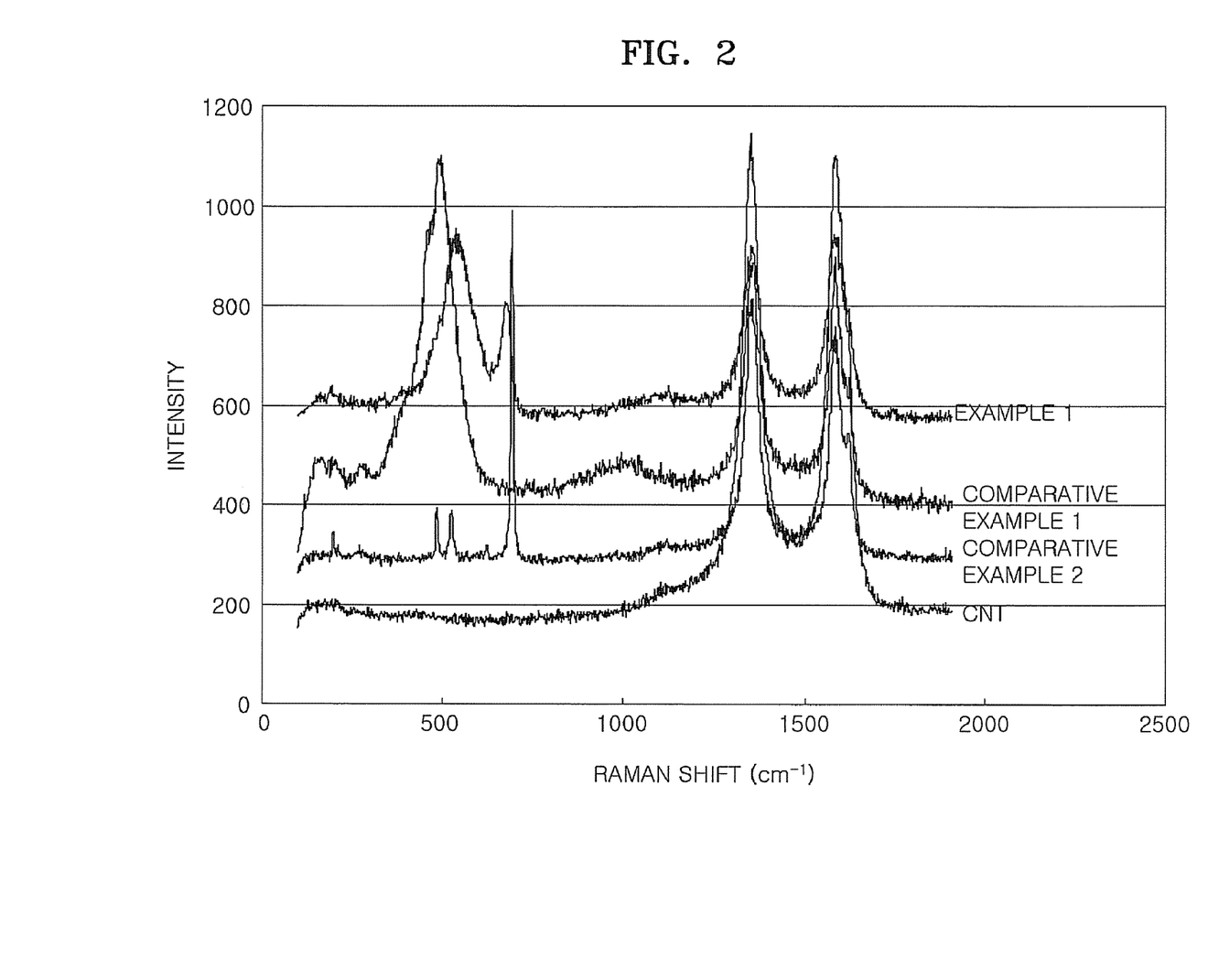
FIG. 2 is a graph of intensity versus raman shift showing raman spectrum analysis results of transition metal/carbon nanotube composite Example 1 and Comparative Examples 1 and 2.

FIG. 2 is a graph of intensity versus raman shift showing a comparison in raman spectrum analysis of the transition metal/carbon nanotube composite of Example 1 and Comparative Examples 1 and 2.

Referring now to FIG. 2, under raman spectrum analysis conditions of: an Ar-ion laser with a wavelength of 514.532 nm: power of 0.5 mW at sample; time of 90 seconds; and an accumulation of 1 objective×50 (e.g., about 0.84 μm), the transition metal/carbon nanotube composite prepared according to Example 1 exhibits a first peak that in a raman shift range with a raman spectrum of $531\pm20$ $cm^{-1}$ and a second peak in a raman shift range with a raman spectrum of $680\pm20$ $cm^{-1}$. A ratio of a full width at half maximum of the second peak ("FWHM2") to a full width at half maximum of the first peak ("FWFM1"), e.g., FWHM2/FWFM1, is about 0.3, e.g., is in range from about 0.1 to about 0.5. Thus, it may be seen that the peak represents the transition metal oxide coated on the carbon nanotube, e.g., a nickel-cobalt oxide including $NiCo_2O_4$.

Referring to FIG. 2, it may be seen that the peak pattern in Example 1 is different from the peak pattern for a nickel oxide/carbon nanotube composite ("NiO/CNT") of Comparative Example 1 and the peak pattern for a cobalt oxide/carbon nanotube composite ("$Co_3O_4$/CNT") of Comparative Example 2.

The spectrum analysis results shown in FIGS. 1 and 2 illustrate that the nickel-cobalt oxide included in the transition metal/carbon nanotube composite according to exemplary embodiments, as prepared according to Example 1, 2 and/or 3, is not a simple mixture of NiO and $Co_3O_4$, but instead constitutes a substantially different and new type of nickel-cobalt oxide including $NiCo_2O_4$.

The transition metal/carbon nanotube composite according to an exemplary embodiment may be used in a lithium secondary battery, a super-capacity capacitor (e.g., an electronic bilayer capacitor and/or a pseudocapacitor, for example), and/or an electrode of a polymer battery including an electrode for a capacitive deionization device, but alternative exemplary embodiments are not limited thereto.

Hereinafter, an exemplary embodiment of an electrode for a capacitive deionization device and a capacitive deionization device including the electrode will be described in further detail with reference to FIGS. 3 and 4.

An electrode for a capacitive deionization device according to an exemplary embodiment includes an active material layer including the transition metal/carbon nanotube composite as described in greater detail above.

According to an exemplary embodiment, the active material layer includes the transition metal/carbon nanotube composite and a binder. In an exemplary embodiment, the active material layer may further include a conductive agent. In addition, the active material layer may be disposed as a stand-alone component or, alternatively, may be disposed on a supporting member.

An amount of active material of the active material layer may be from about 70 wt % to about 98 wt % based on 100 wt % of the electrode. When the amount of the active material is less than about 70 wt % based on 100 wt % of the electrode, a capacitance of the electrode decreases. When the amount of the active material is greater than about 98 wt % based on 100 wt % of the electrode, a self-coherence of the active material decreases. In either case, an electric conductivity and stability of the electrode may decrease.

The binder may include styrene butadiene rubber ("SBR"), carboxymethyl cellulose ("CMC"), and/or polytetrafluoroethylene (PTFE), for example.

The conductive agent may include carbon black, vapor growth carbon fiber ("VGCF"), graphite, and/or mixtures thereof, but alternative exemplary embodiments are not limited thereto.

Figure 3:
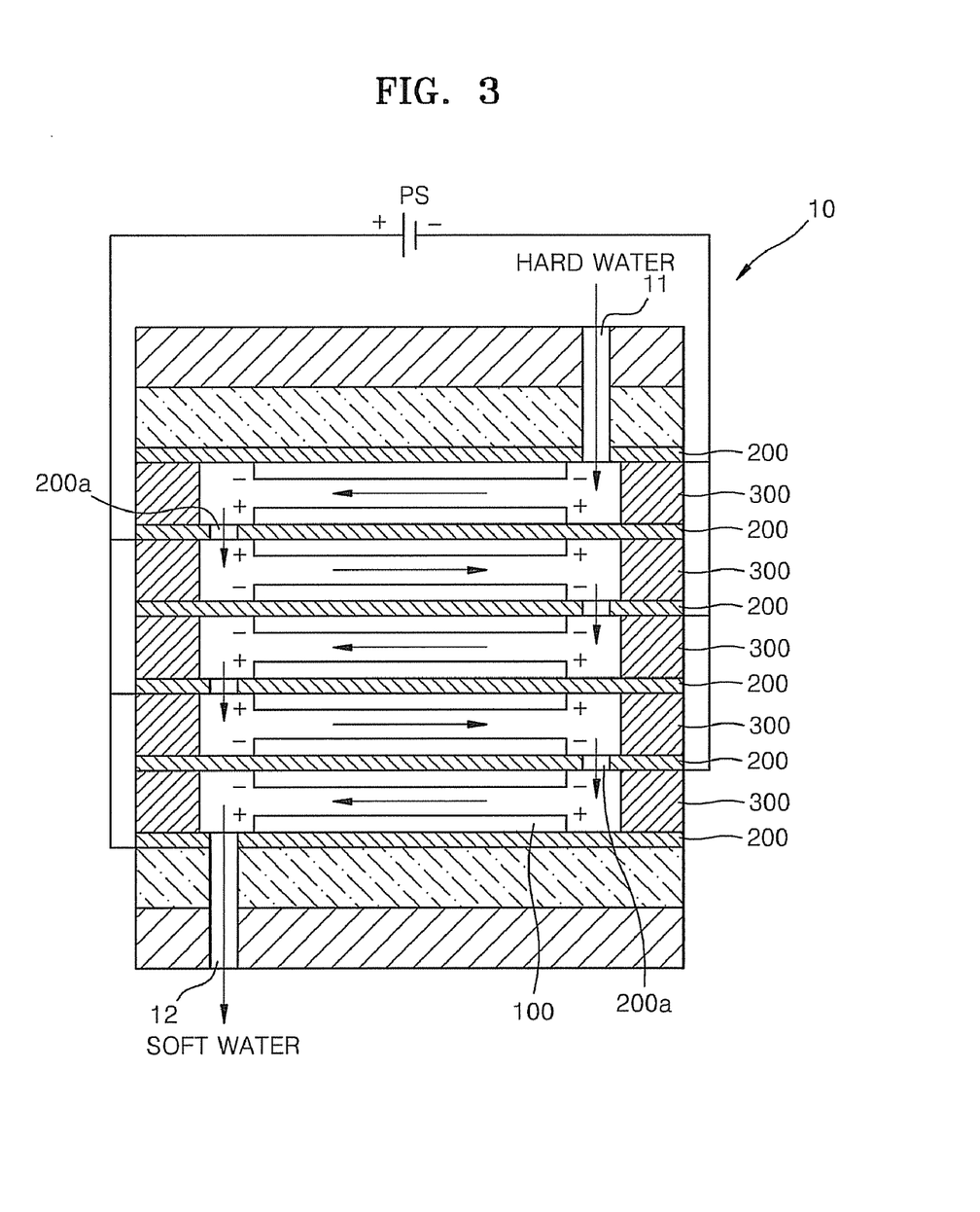
FIG. 3 is a cross-sectional view of an exemplary embodiment of a capacitive deionization device including a plurality of electrodes.

FIG. 3 is a cross-sectional view of an exemplary embodiment of a capacitive deionization device 10 including a plurality of electrodes 100. In an exemplary embodiment, the capacitive deionization device 10 is a serpentine type water softener, as shown in FIG. 3.

Referring to FIG. 3, the capacitive deionization device 10 includes electrodes 100 of the plurality of electrodes 100, a plurality of current collectors 200, and a plurality of separators 300. The electrodes 100 are disposed on one or, alternatively, both sides of current collectors 200 of the plurality of current collectors 200. Combinations including at least one of the electrodes 100 and at least one of the current collectors 200 are stacked in a plurality of layers to form a stack, and separators 300 of the plurality of separators 300 are disposed between adjacent pairs of the combinations of the at least one of the electrodes 100 and the at least one of the current collectors 200. Thus, a flow path is defined between the adjacent pairs of the combinations. A hole 200a is formed in an exposed end of each of the current collectors 200, in which the electrodes 100 are not formed. Thus, hard water flows into the capacitive deionization device 10 and through the stack via an inlet 11 in a substantially serpentine manner (or, alternatively, in a zigzag manner) through the flow path and the holes 200a. As the hard water passes through the stack, the hard water is softened, e.g., is changed into soft water, and the soft water is externally discharged from the capacitive deionization device 10 via an outlet 12.

A power supply PS is electrically connected to the current collectors 200, which form an electrical path to supply an electric charge to the electrodes 100. Specifically, during charging of the electrodes 100, the hard water is softened as it flows through the stack. In contrast, the electric charge accumulated in the electrodes 100 is discharged to regenerate the electrodes 100. In an exemplary embodiment, the current collector 200 may have a structure such as a carbon plate, a carbon paper, a metal plate, a metal mesh, a metal foam and/or combinations thereof. The current collector 200 may include aluminum, nickel, copper, titanium, stainless, iron and/or mixtures thereof.

The separators 300 define a flow path between the stacked electrodes 100, and prevent electrical contact between, e.g., insulate, the electrodes 100 and the current collectors 200.

An operation of the capacitive deionization device 10 according to an exemplary embodiment will be described in further detail.

First, a process of softening hard water (e.g., a charging process) is performed as follows.

While the power supply PS applies a direct current ("DC") voltage to the electrodes 100, hard water flows into the stack of the capacitive deionization device 10 via the inlet 11. The electrodes 100 electrically connected to a positive terminal of the power supplier PS are polarized with a positive voltage, while the electrodes 100 electrically connected to a negative terminal of the power supplier PS are polarized with a negative voltage. More specifically, referring to FIG. 3, in each layer of the capacitive deionization device 10, a given electrode 100 polarized with a positive voltage and a corresponding electrode 100 polarized with a negative voltage face each other, with a corresponding separator 300 disposed therebetween. Accordingly, cations, such as hard water constituents (e.g., $Ca^{2+}$ or $Mg^{2+}$), included in the hard water are absorbed into the electrode 100 polarized with a negative voltage. Anions, such as harmful ions (e.g., $Cl^-$), are absorbed into the electrode 100 polarized with a positive voltage. Over time, the cations and anions dissolved in the hard water are absorbed and accumulated in the electrodes 100. Accordingly, the hard water which passes through the stack is softened and is thereby turned into soft water. Put another way, the harmful ions included in the hard water are removed.

When an ionic conductivity of the soft water is equal to or greater than a predetermined value, the electrodes 100 are regenerated. Specifically, power supplied to the capacitive deionization device 10 is stopped and the capacitive deionization device 10 is electrically shorted to discharge the capacitive deionization device 10. Accordingly, the electrodes 100 are discharged, and the ions absorbed into the active material of the electrodes 100 are desorbed. As a result, the active surface of the active material of the electrodes 100 is restored.

Figure 4:
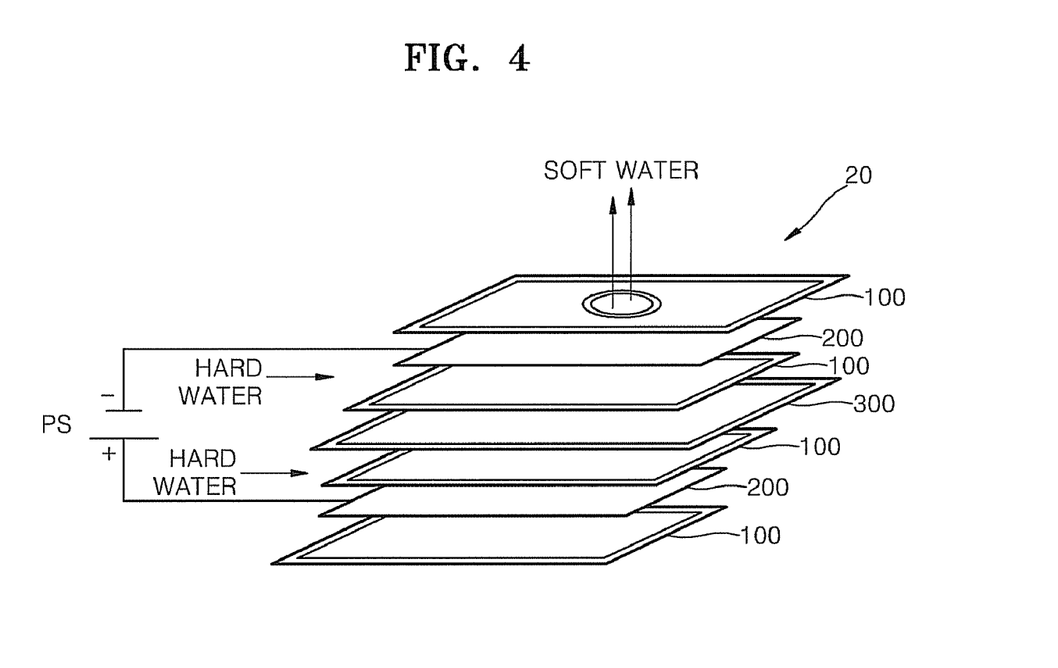
FIG. 4 is an exploded cross-sectional view of an alternative exemplary embodiment of a capacitive deionization device.

FIG. 4 is an exploded cross-sectional view of an alternative exemplary embodiment of a capacitive deionization device 20. In an exemplary embodiment, the capacitive deionization device 20 is a flow-through type water softener, as shown in FIG. 4. The same or like components in FIG. 4 have the same reference characters as those shown in FIG. 3 and described in greater detail above, and any repetitive detailed description thereof will hereinafter be omitted.

Referring to FIG. 4, the capacitive deionization device 20 includes a plurality of electrodes 100, a plurality of current collectors 200, and a plurality of separators 300. Electrodes 100 of a pair of electrodes 100 of the plurality of electrodes 100 are disposed on opposite sides of each current collector 200 of the plurality of current collectors 200. Combinations including a given pair of the electrodes 100 and a corresponding current collectors 200 are stacked in a plurality of layers, and separators 300 of the plurality of separators 300 are disposed between adjacent pairs of the combinations of the electrodes 100 and the corresponding current collector 200, but alternative exemplary embodiments are not limited thereto. For example, in an alternative exemplary embodiment, an electrode 100 may be disposed on only one side of each of the current collectors 200.

The capacitive deionization device 20 according to the exemplary embodiment shown in FIG. 4 is different from the capacitive deionization device 10 according to the exemplary embodiment shown in FIG. 3 in that a flow path of hard water of the capacitive deionization device 20 is a flow-through type path, instead of the serpentine type path described in greater detail above with reference to FIG. 3. As shown in FIGS. 3 and 4, arrangements of elements in the capacitive deionization device 10 and the capacitive deionization device 20 are different, such that the capacitive deionization device 10 and the capacitive deionization device 20 have different flow paths.

Materials and operation of the capacitive deionization device 20 are substantially the same as described in greater detail above with reference to the capacitive deionization device 10 according to the exemplary embodiment shown FIG. 3, and thus, and repetitive detailed explanation thereof has been omitted.

Thus, a capacitive deionization device including an electrode having a transition metal/carbon nanotube composite according to an exemplary embodiment provides advantages which include, but are not limited to, substantially improved performance and durability due to a high electric conductivity and large specific surface area of the transition metal/carbon nanotube composite.

Figure 5:
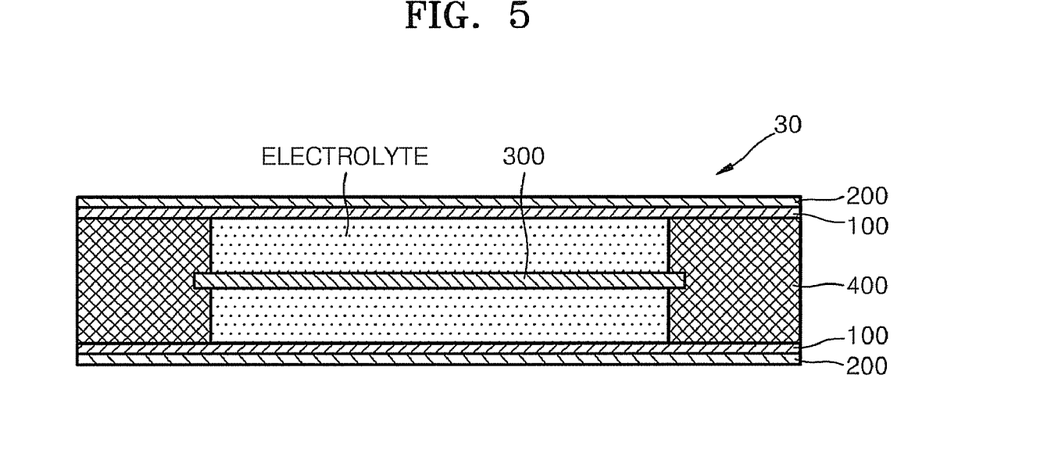
FIG. 5 is a cross-sectional view schematically illustrating an exemplary embodiment of an electric double layer capacitor including an electrode.

FIG. 5 is a cross-sectional view schematically illustrating an embodiment of an electric double layer capacitor 30 including an embodiment of an electrode 100. The electric double layer capacitor 30 may store electricity.

Referring to FIG. 5, the electric double layer capacitor 30, according to an embodiment, includes an electrode 100, a current collector 200, a separator 300 a gasket 400 and an electrolyte 500.

In detail, the current collectors are spaced apart from and face each other, wherein the separator 300 is disposed between the current collectors, each electrode 100 is disposed on a side of the current collector facing the separator 300, respectively, an electrolyte is disposed in a space between each electrode 100 and the separator 300, and the gasket 400 may reduce or effectively prevent the electrolyte from flowing out of the space by sealing sides of the space.

The electrolyte may include an aqueous electrolyte in which a salt is dissolved, and may include a sodium chloride aqueous solution, a magnesium sulfate aqueous solution, a magnesium calcium aqueous solution, or the like or a mixture including at least one of the foregoing.

Operation and effects of the electric double layer capacitor 30 are described in further detail below.

First, when a DC voltage is applied to the electrodes, anions of the electrolyte are electrostatically induced to move to the electrode 100 polarized with a positive voltage, and cations of the electrolyte are electrostatically induced to move to the electrode 100 polarized with a negative voltage. Accordingly, in a charging process, the anions and the cations are absorbed into the active material of the electrodes, and thus an electric double layer is formed on an interface of the electrode 100 and the electrolyte. Such a process is called charging. When the charging is completed, current does not substantially flow in the electric double layer capacitor 30. When a circuit (not shown) including a load (not shown) is disposed on the electrodes 100 after the charging, electrical energy of the electric double layer is slowly reduced. Such a process is called discharging.

During discharging, the electrodes 100 slowly lose polarity, and thus the ions absorbed in the active material of the electrode 100 are desorbed. Accordingly, the active surface of the active material of the electrode 100 is restored.

Hereinafter, an exemplary embodiment of a method of preparing the transition metal/carbon nanotube composite will be described in further detail.

An electrode for a capacitive deionization device according to an exemplary embodiment is prepared by mixing a carbon nanotube and a urea solution to form a urea/carbon nanotube composite (e.g., a urea and carbon nanotube composite), mixing the urea/carbon nanotube composite and a transition metal salt solution to prepare a precursor solution, hydrolyzing urea in the precursor solution, coating a transition metal hydroxide on the carbon nanotube, and then performing high temperature treatment on the resultant.

In an exemplary embodiment, the urea/carbon nanotube composite is prepared by mixing the carbon nanotube and the urea solution, but alternative exemplary embodiments are not particularly limited thereto. In an alternative exemplary embodiment, a carbon nanotube may be added to a urea solution, and then the resultant combination may be uniformly mixed by stirring, for example. Although exemplary embodiments are not limited to any particular form, the carbon nanotube mixed with the urea solution may be in a powder state. When the carbon nanotube and the urea solution are mixed, urea in the urea solution is uniformly coated on the carbon nanotube through physical absorption of the urea to form the urea/carbon nanotube composite.

A hydrophilic functional group may be added to the carbon nanotube added to the urea solution. In this case, the carbon nanotube is sufficiently dispersed in the urea solution, and the urea is thereby sufficiently coated on the carbon nanotube, as compared to a case in which a hydrophilic functional group is not present. Examples of the hydrophilic functional group may include a carboxyl functional group (e.g., —COON or —COO⁻), a hydroxyl functional group (e.g., —OH), and/or an amino functional group (e.g., —NH$_2$) and combinations thereof, but alternative exemplary embodiments are not limited thereto.

A method of adding the hydrophilic functional group to the carbon nanotube is not particularly limited. In an exemplary embodiment, for example, an acid treatment is performed on a carbon nanotube in an acid solution. In this case, impurities, such as a metal catalyst which is generated when the carbon nanotube is formed in a powder state, are removed.

In an exemplary embodiment, the acid treatment of the carbon nanotube may be performed when the carbon nanotube is supported by an acid solution, but alternative exemplary embodiments are not limited thereto. The acid solution may be prepared by using a strong acid which may include a sulfuric acid, a nitric acid, a hydrochloric acid and/or mixtures thereof, for example. In performing the acid treatment, a hydrophilic functional group may be formed on a surface of the carbon nanotube. Thus, the carbon nanotube is sufficiently dispersed in the urea solution due to a repulsive force between functional groups, and physical adsorption of the urea is thereby easily achieved.

Acid-treatment conditions may be adjusted to control an amount of a functional group formed on the surface of the carbon nanotube. In an exemplary embodiment, for example, the acid treatment may be performed for about 2 hours to about 6 hours at a temperature in a range of about 60° C. to about 90° C. while the carbon nanotube is added to a strong acid solution with a pH of about 0.5 or less. Specifically, in an exemplary embodiment, the acid treatment process may be performed for about 2 hours to about 6 hours at a temperature in a range of about 60° C. to about 90° C. while the carbon nanotube is added to a strong acid solution with a pH of 0.

The carbon nanotube on which the acid-treatment is performed is extracted using a method such as wherein the acid solution including the carbon nanotube is passed through a suitable filter to filter the carbon nanotube, the carbon nanotube is washed by distilled water several times, and moisture in the carbon nanotube is evaporated by applying heat to the carbon nanotube, for example. By washing and drying the carbon nanotube, a portion of the carbon nanotube, which may have been aggregated during the acid treatment, is formed in a powder state.

Conditions for preparing the urea/carbon nanotube composite by adding the carbon nanotube or heat-treated carbon nanotube to the urea solution and stirring the resultant combination may include, for example, stirring the urea solution including the carbon nanotube for about 4 hours to about 6 hours at room temperature. However, alternative exemplary embodiments are not limited thereto, and the above-mentioned steps may be adjusted according to an amount of the carbon nanotube used, a concentration of the urea solution and/or an amount of the urea in the urea/carbon nanotube composite, for example.

The urea solution may be prepared by dissolving urea in a solvent such as water or ammonia water, for example. More specifically, a thickness and weight of a urea layer adsorbed into the carbon nanotube may be linearly proportional to a concentration of the urea solution used. Since the thickness of a metal oxide layer coated on the carbon nanotube is determined according to a weight ratio of urea with respect to the carbon nanotube in the urea/carbon nanotube composite, the thickness of the metal oxide layer coated is easily controlled by controlling the concentration of the urea solution used.

In an exemplary embodiment, an amount of the urea may be from about 20 parts by weight to about 75 parts by weight based on 100 parts by weight of the urea/carbon nanotube composite. However, the amount of the urea may vary with a thickness of a transition metal oxide layer to be formed. For example, when a transition metal oxide is to be coated on a carbon nanotube to a thickness from about 5 nm to about 6 nm, a molar concentration of the urea solution may be from about 5 M to about 7 M, and an amount of the urea may be about 64 wt % based on 100 wt % of the urea/carbon nanotube composite formed.

The urea/carbon nanotube composite prepared as described above may be extracted using a method such as wherein the urea/carbon nanotube composite is filtered using a suitable filter. The extracted urea/carbon nanotube composite may be dried and/or formed into a powder state. In an exemplary embodiment, the urea/carbon nanotube composite may be dried by heating the urea/carbon nanotube composite to a temperature from about 50° C. to about 60° C. nanotube for about 46 hours to about 50 hours, but alternative exemplary embodiments are not limited thereto.

The precursor solution may be prepared by mixing the urea/carbon nanotube composite and the transition metal salt solution. The mixing method is not particularly limited. In an exemplary embodiment, for example, a carbon nanotube may be added to a precursor solution, and then the resultant combination may be stirred.

A solvent of the transition metal salt solution may include nitric nickel, acetic nickel, nickel chloride, nickel carbonate, nickel sulfate and/or mixtures thereof, as well as cobalt sulfate, nitric cobalt, cobalt chlorite and/or mixtures thereof as well as mixtures of the abovementioned components, but alternative exemplary embodiments are not limited thereto.

The type of solvent in which the transition metal salt is dissolved is not particularly limited. In an embodiment, for example, the solvent may include water, an organic solvent and/or mixtures thereof. When only water is used as the solvent, urea having high solubility with respect to water may be dissolved in an external solution (e.g., a bulk solution) prior to hydrolysis, as will be described in further detail below. In this case, the urea is hydrolyzed in an entire solution during the hydrolysis. When the urea is hydrolyzed in the entire solution, a pH change of the entire solution occurs instead of a pH change of a portion of the solution around the carbon nanotube. In this case, homogeneous nuclei may be generated or grown, and thus a nickel-cobalt hydroxide may be precipitated from the entire solution as well as from a surface of the carbon nanotube.

The organic solvent used is not particularly limited, and for example, may be an organic solvent which has low solubility with respect to urea and which mixes well with water. When an organic solvent is used, a mixture solvent in which water and the organic solvent are uniformly mixed may be prepared, while a nickel salt and a cobalt salt are completely dissolved in the mixture solvent, and thus an entirely uniform solution may be prepared. In addition, water for hydrolysis may be included in the mixture solvent and, additionally, urea may be effectively prevented from being dissolved in and precipitated from the solution due to an organic solution having low solubility with respect to urea. Examples of the organic solvent may include an alcohol-based solvent such as a methanol, ethanol, propanol or butanol solvent, for example. Examples of the organic solvent may include a propanol solvent having an appropriate affinity with respect to water. A mixing ratio of the organic solvent and the water is not particularly limited. For example, a volume ratio of water to the organic solvent (e.g., water:organic solvent) may be from about 4:96 to about 10:90. The mixture solvent may be used in a volume ratio from about 4:96 to about 7:93.

When the transition metal salt solution is prepared by adding the transition metal salt to the mixture solvent, a concentration of the transition metal salt solution may be appropriately determined according to a thickness of a transition metal oxide layer to be coated. In an exemplary embodiment, for example, the transition metal salt solution may be prepared to have a molar concentration of the transition metal salt solution from about 0.05 M to about 1 M.

The pH of the precursor solution is changed only around the urea/carbon nanotube composite by hydrolyzing urea of the urea/carbon nanotube composite in the precursor solution. A method of hydrolyzing the urea is not particularly limited. In an exemplary embodiment, for example, a microwave heating method may be used. In the microwave heating method, an entire solution may be uniformly heated. In addition, a reaction time may be substantially reduced as compared to a heating method using conductive heat, for example. Thus, urea are effectively prevented from being dissolved in a solution, and hydrolysis of the urea is thereby smoothly performed. In an exemplary embodiment, the hydrolysis may be performed for about 8 minutes to about 12 minutes at a temperature in a range of about 110° C. to about 150° C. The hydrolysis may be performed for about 8 minutes to about 12 minutes at a temperature from about 120° C. to about 140° C. while the precursor solution is sealed in, but alternative exemplary embodiments are not limited thereto.

The hydrolysis of the urea may be performed using the microwave heating method described. Specifically, the hydrolysis may be performed on only a surface portion of the carbon nanotube where the urea exists. Thus, a regional change in pH may occur in the precursor solution as described above. The hydrolysis occurs regardless of the pH of the precursor solution. The hydrolysis of the urea may be performed according to the pH of the precursor solution, as shown in Reaction Schemes 1 and 2 below. More specifically, reaction Scheme 1 represents a path of hydrolysis of urea when the precursor solution is acid (pH <7). Reaction Scheme 2 represents a path of hydrolysis of urea when the precursor solution is basic (pH >7).

[Reaction Scheme 1]

[Reaction Scheme 2]

According to hydrolysis occurring in paths represented by Reaction Schemes 1 and 2, $NH_3$ is generated and $H^+$ is depleted in the precursor solution, and thus the pH of the precursor solution changes, e.g., increases. Since the urea exists only on a surface of the carbon nanotube, the hydrolysis is performed only on the surface of the carbon nanotube. Thus, a change in pH of the precursor solution occurs only on the surface of the carbon nanotube, and heterogeneous nuclei may be generated or grown. In this regard, the pH of the precursor solution on the surface of the carbon nanotube may be controlled to be from about pH 8 to about pH 10. However, alternative exemplary embodiments are not limited to this range of pH, and thus the range of pH may be adjusted according to a type and thickness of a nickel or cobalt salt coated on the carbon nanotube.

By performing the above-described operations, preparation of a transition metal hydroxide/carbon nanotube composite is performed, wherein, for example, nickel-hydroxide, nickel-cobalt hydroxide or cobalt hydroxide is uniformly formed on a surface of the carbon nanotube.

According to an exemplary embodiment, in the nickel-cobalt hydroxide, a molar ratio of the nickel to the cobalt is about 1:2, and the transition metal hydroxide may further include a nickel hydroxide, a cobalt hydroxide and/or mixtures thereof. The transition metal hydroxide/carbon nanotube composite may be separated using a method such as wherein the transition metal hydroxide/carbon nanotube composite is separated by performing centrifugation to the transition metal salt solution several times, and may also be washed with distilled water several times, and then remaining negative and metal ions may be removed. According to an exemplary embodiment, after separating the transition metal hydroxide/carbon nanotube composite from the solution, the transition metal hydroxide/carbon nanotube composite may be dried for about 22 hours to about 26 hours at a temperature from about 80° C. to about 120° C. Although alternative exemplary embodiments are not limited thereto, the transition metal hydroxide/carbon nanotube composite may be in the form of powder.

In an exemplary embodiment, a transition metal/carbon nanotube composite in which a transition metal oxide layer is formed on a carbon nanotube is prepared by heating the transition metal hydroxide/carbon nanotube composite at a high temperature. Such heat treatment may be performed for about 30 minutes to about 2 hours at a temperature from about 250° C. to about 450° C. in an air atmosphere. At a temperature less than about 250° C., phase transition from hydroxide to oxide may not occur. At a temperature greater than about 450° C., the carbon nano tube ("CNT") may be ignited to be depleted in the form of $CO_2$ since the heat treatment is performed in an air atmosphere. Under the abovementioned heat treatment conditions, the transition metal/carbon nanotube composite has substantially improved capacitance characteristics, and thus may be used as an electrode for a capacitive deionization device, for example.

Hereinafter, exemplary embodiments will be described in further detail with reference to examples thereof. However, the following examples are only for illustrative purposes only, and alternative exemplary embodiments are not limited thereto.

Example 1

Acid Treatment of Carbon Nanotube Powder

An acid treatment process was performed on a carbon nanotube by adding 3 g of carbon nanotube in a powder state to 250 mL of a nitric acid aqueous solution having a concentration of 60%, and then heating the resultant for 8 hours at 100° C. Then, the carbon nanotube was filtered by passing the acid solution through a filter. The acid-treated carbon nanotube was prepared by washing the filtered carbon nanotube with distilled water several times, and drying and powdering the filtered carbon nanotube.

Synthesis of Urea/Carbon Nanotube Composite

A urea/carbon nanotube composite was prepared by adding 1 g of the acid-treated carbon nanotube to a urea solution and stirring the resultant for about 5 hours at room temperature. The urea/carbon nanotube composite was separated by using a filter and was washed with distilled water several times. Then, the urea/carbon nanotube composite was formed in a powder state by drying the separated urea/carbon nanotube composite for 48 hours at about 55° C.

Preparation of Nickel Hydroxide-Cobalt/Carbon Nanotube Composite

A mixture solvent was prepared by mixing distilled water and propanol in a volume ratio (distilled water:propanol) of 5:95 and then stirring the resultant for about 1 hour. Then, a nitric nickel solution was prepared by adding nitric nickel to the mixture solvent until the concentration of the resultant was 0.1 M and then stirring the resultant for 24 hours. A nitric cobalt solution was prepared using the same method as that of the nitric nickel solution. 50 mL of a solution was prepared by mixing the nitric nickel solution and the nitric cobalt solution in a ratio of 1:2 and adding 0.1 g of the urea/carbon nanotube composite prepared as described above. A nickel hydroxide-cobalt/carbon nanotube composite was prepared by sealing and storing the solution so that the resultant is mixed for about 10 minutes at 130° C. by using a microwave heating method.

Remaining negative and nickel ions were removed by passing the nickel hydroxide-cobalt/carbon nanotube composite through a filter, and washing the nickel hydroxide-cobalt/carbon nanotube composite with distilled water several times. Then, the nickel hydroxide-cobalt/carbon nanotube composite was formed in a powder state by drying the nickel hydroxide-cobalt/carbon nanotube composite for about 24 hours at 100° C.

Preparation of Transition Metal/Carbon Nanotube Composite

A transition metal/carbon nanotube composite in which a nickel-cobalt oxide was coated on a carbon nanotube was prepared by performing heat-treatment on a nickel hydroxide-cobalt/carbon nanotube composite for 1 hour at 300° C. in an air atmosphere.

Example 2

A transition metal/carbon nanotube composite was prepared in the same manner as described above for Example 1, except that a nitric nickel solution and a nitric cobalt solution were added in a ratio of 2:1.

Example 3

A transition metal/carbon nanotube composite was prepared in the same manner as described above for Example 1, except that a nitric nickel solution and a nitric cobalt solution were added in a ratio of 1:4.

Comparative Example 1

A nickel oxide/carbon nanotube composite was prepared in the same manner as described above for Example 1, except that only 50 mL of a nitric nickel solution was added.

Comparative Example 2

A cobalt oxide/carbon nanotube composite was prepared in the same manner as described above for Example 1, except that only 50 mL of a nitric cobalt solution was added.

Table 1 shows measurement results of capacitances of composites prepared according to Examples 1 to 3 and Comparative Examples 1 and 2.

TABLE 1

|  | Ratio of Ni:Co | Capacitance (F/g) |
| --- | --- | --- |
| Example 1 | 1:2 | 402 |
| Example 2 | 2:1 | 355 |
| Example 3 | 1:4 | 321 |
| Comparative Example 1 | 3:0 | 319 |
| Comparative Example 2 | 0:3 | 290 |

As shown in Table 1, the transition metal/carbon nanotube composites prepared according to Examples 1 to 3 have substantially improved capacitances compared to capacitances of the nickel oxide/carbon nanotube composite according to Comparative Example 1 and the cobalt oxide/carbon nanotube composite according to Comparative Example 2.

FIG. 1 is a graph showing XRD analysis results for the transition metal/carbon nanotube composites of Examples 1 to 3 and Comparative Examples 1 and 2.

Referring again to FIG. 1, the transition metal/carbon nanotube composite ("$NiCo_2O_4$/CNT") prepared according to Example 1, 2, and 3 exhibits a peak having a high-shift of about 1 degree from a first $Co_3O_4$ peak at about 60 degrees, and a second $Co_3O_4$ peak at about 65 degrees, as described above in greater detail, unlike in Comparative Examples 1 and 2.

In addition, peaks characteristic to NiO/CNT of Comparative Example 1 are not shown in the analysis result of Example 1.

FIG. 2 is a graph showing raman spectrum analysis results for the transition metal/carbon nanotube composite of Example 1 and Comparative Examples 1 and 2.

Referring again to FIG. 2, raman peak pattern of the transition metal/carbon nanotube composite ("$NiCo_2O_4$/CNT") of an exemplary embodiment prepared according to Example 1 is different from raman peak patterns of the nickel oxide/carbon nanotube composite ("NiO/CNT") prepared according to Comparative Example 1 and the cobalt oxide/carbon nanotube composite ("$Co_3O_4$/CNT") prepared according to Comparative Example 2. Thus, the transition metal/carbon nanotube composite prepared according to the exemplary embodiment of Example 1, 2 and/or 3 is not a simple mixture of NiO/CNT and $Co_3O_4$/CNT, but instead includes a different and substantially improved type.

According to exemplary embodiments as described herein, a transition metal/carbon nanotube composite includes substantially improved capacitance characteristics providing a substantially improved ionic material removal rate, as well as substantially improved performance and durability when the transition metal/carbon nanotube composite is included as an electrode in a capacitive deionization device.

It will be understood that the exemplary embodiments described herein should be considered in a descriptive sense only and not for purposes of limitation. Thus, the present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A nanotube composite comprising:
   a carbon nanotube; and
   a transition metal oxide coating layer disposed on an entire surface of the carbon nanotube, wherein the transition metal oxide coating layer comprises a nickel-cobalt oxide, wherein a molar ratio of nickel to cobalt in the nickel-cobalt oxide is about 1:2.

2. The nanotube composite of claim 1, wherein the nickel-cobalt oxide comprises $NiCo_2O_4$.

3. The nanotube composite of claim 1, wherein the transition metal oxide coating layer further comprises at least one selected from the group consisting of a nickel oxide, a cobalt oxide and a mixture thereof.

4. The nanotube composite of claim 3, wherein the nickel oxide comprises NiO.

5. The nanotube composite of claim 3, wherein the cobalt oxide comprises $Co_3O_4$.

6. The nanotube composite of claim 1, wherein, under X-ray diffraction analysis conditions including a phase from about 5 degrees to about 80 degrees, 0.02 degrees/step and X-rays of 40 kV/20 mA, the nickel-cobalt oxide exhibits peaks having right-shifts of about 0.5 degrees to about 1.5 degrees from each of a first $Co_3O_4$ peak at about 57 degrees to about 61 degrees and a second $Co_3O_4$ peak at about 63 degrees to about 67 degrees.

7. The nanotube composite of claim 1, wherein, under raman spectrum analysis conditions including an Ar-ion laser having a wavelength of 514.532 nm, a power of 0.5 mW at sample, time of 90 seconds, and an accumulation of 1 objective×50 corresponding to about 0.84 μm,
   the nickel-cobalt oxide exhibits a first peak in a raman shift range with a raman spectrum of $531\pm20$ cm$^{-1}$ and a second peak in a raman shift range with a raman spectrum of $680\pm20$ cm$^{-1}$, and
   a ratio of a full width at half maximum of the second peak to a full width at half maximum of the first peak is from about 0.1 to about 0.5.

8. An electrode for a capacitive deionization device, the electrode comprising a nanotube composite, wherein
   the nanotube composite comprises:
   a carbon nanotube; and
   a transition metal oxide coating layer disposed on an entire surface of the carbon nanotube, and the transition metal oxide coating layer comprises a nickel-cobalt oxide wherein a molar ratio of nickel to cobalt in the nickel-cobalt hydroxide is about 1:2.

9. A capacitive deionization device comprising an electrode, wherein
   the electrode comprises a nanotube composite,
   the nanotube composite comprises:
   a carbon nanotube; and
   a transition metal oxide coating layer disposed on the carbon nanotube, and the transition metal oxide coating layer comprises a nickel-cobalt oxide.

10. An electric double layer capacitor comprising an electrode, wherein
    the electrode comprises a nanotube composite,
    the nanotube composite comprises:

a carbon nanotube; and a transition metal oxide coating layer disposed on the carbon nanotube, and the transition metal oxide coating layer comprises a nickel-cobalt oxide.

11. A method of preparing a nanotube composite, the method comprising:

coating a transition metal hydroxide on a carbon nanotube; and performing high temperature treatment on the carbon nanotube having the transition metal hydroxide coated thereon, wherein the transition metal hydroxide comprises a nickel-cobalt hydroxide.

12. The method of claim 11, wherein a molar ratio of nickel to cobalt in the nickel-cobalt hydroxide is about 1:2.

13. The method of claim 11, wherein the transition metal hydroxide further comprises at least one selected from the group consisting of a nickel hydroxide, a cobalt hydroxide and a mixture thereof.

14. The method of claim 11, wherein the coating the transition metal hydroxide on the carbon nanotube comprises hydrolyzing urea in a precursor solution.

15. The method of claim 14, wherein the precursor solution is prepared by mixing a urea and carbon nanotube composite with a transition metal salt solution.

16. The method of claim 15, wherein the transition metal salt solution comprises:

at least one selected from the group consisting of nitric nickel, acetic nickel, nickel chloride, nickel carbonate, nickel sulfate and mixtures thereof;

at least one selected from the group consisting of cobalt sulfate, nitric cobalt, cobalt chlorite and mixtures thereof; and mixtures thereof.

17. The method of claim 15, wherein the urea and carbon nanotube composite is prepared by mixing the carbon nanotube and a urea solution.

* * * * *